United States Patent [19]

Clarke

[11] 4,195,215

[45] Mar. 25, 1980

[54] WELDABLE SEALANT FORMS

[76] Inventor: Robert W. Clarke, Box 1166, S-171 23 Solna, Sweden

[21] Appl. No.: 951,047

[22] Filed: Oct. 13, 1978

Related U.S. Application Data

[63] Continuation of Ser. No. 771,660, Feb. 24, 1977, abandoned, which is a continuation of Ser. No. 610,440, Sep. 4, 1975, abandoned.

[30] Foreign Application Priority Data

Sep. 20, 1974 [SE] Sweden .............................. 7411829

[51] Int. Cl.² .............................................. B23K 11/10
[52] U.S. Cl. .................................... 219/91.21; 219/92
[58] Field of Search ............................... 219/91.21, 92

[56] References Cited

U.S. PATENT DOCUMENTS

| 2,347,172 | 4/1944 | Cox ..................................... 219/92 X |
| 2,452,805 | 11/1948 | Sussenbach ........................ 219/92 X |
| 2,666,835 | 1/1954 | Elleman ............................. 219/91.21 |
| 2,909,643 | 10/1959 | Graves ................................ 219/92 X |
| 3,277,268 | 10/1966 | Williams ................................. 219/92 |
| 3,437,783 | 4/1969 | Lemelson ........................... 219/117.1 |
| 3,602,682 | 8/1971 | Hoeffleur ................................ 219/92 |
| 3,795,047 | 3/1974 | Abolafia ................................. 29/625 |

*Primary Examiner*—E. A. Goldberg
*Attorney, Agent, or Firm*—Burns, Doane, Swecker & Mathis

[57] ABSTRACT

The specification discloses methods of joining two or more metal members together by combinations of innovative sealants, welding and/or cure heat. More particularly, it relates to methods and materials for improving the sealing, welding, and spacing of metal parts by combining adhesive sealants, fluxes, and metallic beads of discrete shape, size, and composition; and further, by novel organization of such components into weldable seals of simple or complex shape; and further, by magnetically treating such combinations to permit the application of wet or dry forms of the weldable sealant in self-retained-in-place locations while awaiting further assembly operations; and further, to utilize combinations of such components so that they can be handled dry prior to and during joining of the metal parts, with cure initiating as a result of weld heat, completed where necessary in subsequent production stages such as in automotive paint-drying operations.

14 Claims, 9 Drawing Figures

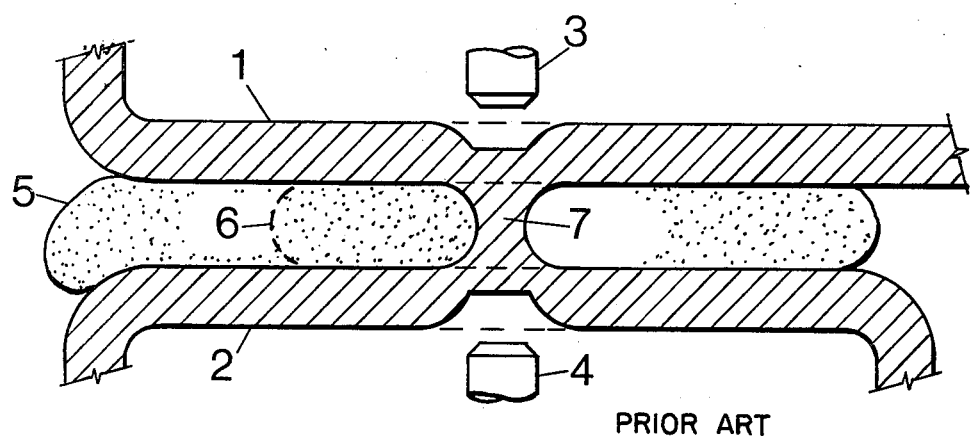
PRIOR ART
FIG 1
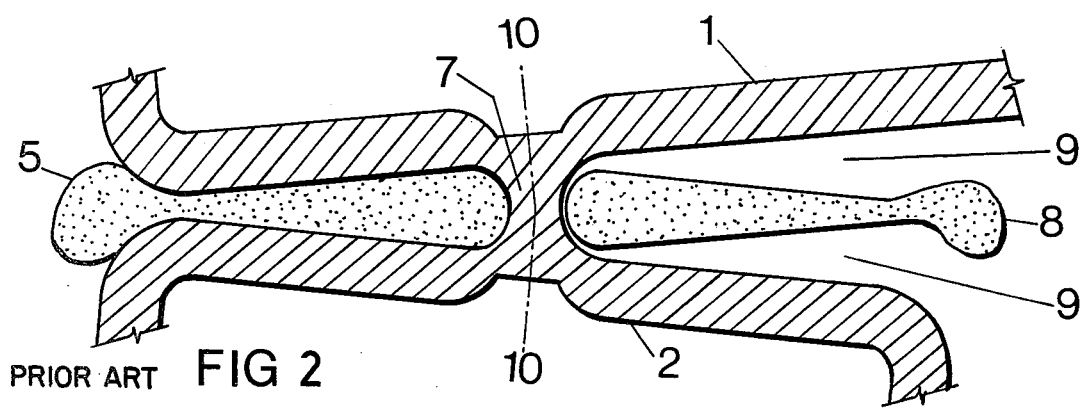
PRIOR ART  FIG 2
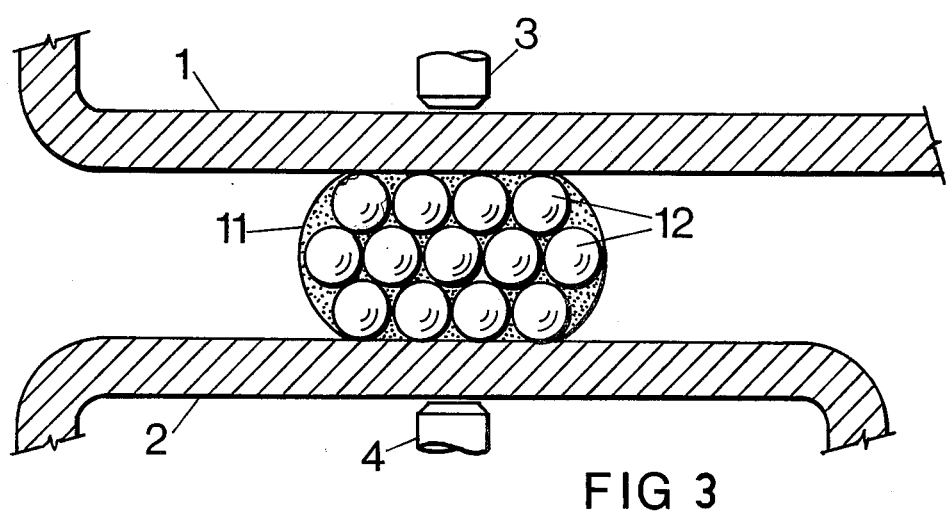
FIG 3

WELDABLE SEALANT FORMS

This is a continuation of application Ser. No. 771,660, filed Feb. 24, 1977 now abandoned which is a continuation of Ser. No. 610,440, filed Sept. 4, 1975 and now abandoned.

CROSS-REFERENCES

U.S. Pats. Nos:
2,909,643, Graves, Oct. 20, 1959
3,102,190, Chapleur et al, Aug. 27, 1963
3,437,783, Lemelson, July 26, 1966

SUMMARY OF THE INVENTION

In production assembly of metal parts by spot welding, a sealant is often incorporated between the parts to protect the concealed surfaces from corrosion, or to make it tight under light or gas pressure, or to insulate against vibration or sound transmission. Such sealants are generally plastic to some degree, occasionally elastic to some degree, and usually adhesive only to the degree required to retain the material in place prior to bounding the metal parts by other means, usually spot welding.

Problems resulting from such methods include extrusion of the scalant from the joint, or conversely, inadequate spread of the sealant; destruction of sealant characteristics by weld heat, and conversely, reduction of weld quality due to sealant composition and/or weld gap; failure to remain sealed under operating vibration; excessive flexing of joint destructive to welds; generation of noxious gases in the weld area due to sealant composition; problems in handling or working near sealants with sticky surfaces, and their vulnerability prior to mating of the metal parts; inability of certain strip-form scalants to accommodate gaps due to imperfect mating of the metal parts (such as sealants based on the use of fixed thickness metal bands with adhesive coatings); excessive joint pressures from the sealant causing overstressing of welds; and wastefully high weld currents to bridge maximum expected gaps, resulting in destructively excessive current at minimum gaps. The use of metallic powders has been proposed before to help improve electrical conductivity, or to aid heat dispersion, or to help give body to the sealant, or in the case of solders to create a paste flux with the solder included in powder form. Such powders have a crystalline, flake, or crushed irregular shape such as may be produced by grinding operations or by crystalline deposition, and can permit a build-up of particles leading to uncertainty of joint thickness (or weld-gap) hereafter referred to simply as gap.

This invention uses discrete metal beads, either spherical or of rounded shape (i.e. non-spherical metal beads of a rounded shape), graded as to size and composition. Such beads can be produced by spattering processes or from ball-bearing manufacturing processes. Such beads roll on each other, automatically settling under pressure to a one-bead gap minimum. In this invention, their dispersion in a support medium such as the sealant, is rigidly controlled to maintain point contact with each other in a continuous fashion. This provides for a consistent relation even when irregularities exist in the mating parts being bonded, any gaps greater than one-bead thickness having identical contacts for weld current, heat transfer, and pressure distribution, as well as assuring the existance of bridge metal for welding, to spare the weakening sacrifice of parent metal from the parts being bonded. The latter also relaxes the critical indexing of weld points such as is necessary when a carefully placed piece of bridge metal must be precisely "found" by electrode positioning.

Further development of this basic part of the invention to dry and/or complex shapes is included, as well as fluxing components, and also the magnetizing of metal components to provide novel handling characteristics.

DESCRIPTION OF DRAWINGS

Other objects of the invention will be appreciated by a study of the following specification, taken in conjunction with the accompanying drawings. These drawings are not to scale, and may exaggerate effects for illustrative purposes. In the drawings:

FIG. 1 is a cross section of a conventional joining of two metal parts using a scalant and spot welding, and shows undesirable effects prior to service demands. This drawing, and FIG. 2, are intended to aid in clarifying certain objects of the invention.

FIG. 2 is a cross section of a conventional joint using a sealant and spot welding as in FIG. 1, showing certain undesirable effects under service conditions.

FIG. 3 is a cross section of the joining of two metal parts using an extruded form of the sealant in accordance with this invention, showing the joint prior to welding, with the sealant starting to adapt as clamping pressure begins.

DETAILED DESCRIPTION

Figure 4:
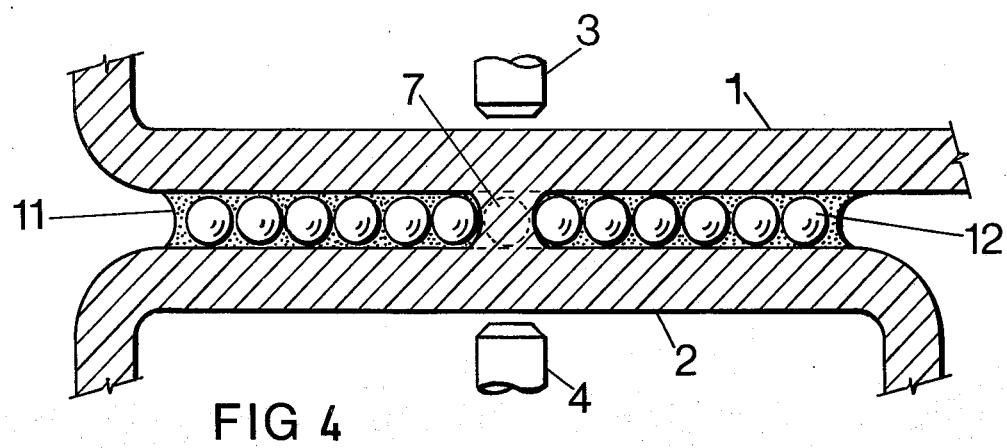
FIG. 4 is a cross section of a joining of two metal parts as in FIG. 3, following clamping and spot welding, and shows the precise control effected over the joint gap, spread of the sealant, and other behaviour within the joint.

In FIG. 1, parts 1 and 2 represent metal members which have just been spot welded by the welding clamp assembly 3 and 4 in a conventional manner, using a relatively inert sealant between the members. Due to difficulties in balancing clamping pressures with sealant consistencies, operating temperatures, and sealant volume applied, the sealant may exude from the joint as at 5, causing an unsightly disfiguration (as in automobile bodies). Alternatively, the sealant may fail to extend far enough, as at 6, leaving a pocket of metal vulnerable to corrosion. This uncertainty as to exact weld gap between parts 1 and 2 leads to costly, excessive electrical power settings in order to jump a maximum gap, often resulting in poor or destroyed welds where the gap is different from a desired ideal. The metal forming the weld, hereafter referred to as bridge metal, has had to come from the parent members 1 and 2, usually resulting in diminished strength in the vicinity of the weld, a cause of early bond failure. Also, although physically inert, conventional sealants are often a cause of contamination during weld fusion, resulting in such defects as metal embrittlement or a spongy nature in the bridge metal 7.

In FIG. 2, the construction of FIG. 1 has been put into service and, as in the case of an automobile body, is represented during one phase of a normal vibration or shaking motion. Parts 1 and 2 are moving in relation to each other, while tethered by the weld 7. Further inducement to exuding of sealant is indicated at 5, while 8 represents the reciprocal effect of sealant distorted during previous phases. The conventional inertia of sealant as at 8, combined with the retreating faces of parts 1 and 2, act to pump surrounding atmosphere (often corrosive) into the joint as at 9. This defeats or aggravates one of the main intentions of the sealant, that of protecting against corrosion. The line 10 represents the axis of the original weld, distorted during repetitive bending, a cause of early bond failure.

In FIG. 3, the welding clamp assembly 3 and 4 is shown beginning to bring parts 1 and 2 together preparatory for welding. The sealant 11, which in this case was placed in extruded or tubular form, contains discrete metal beads 12 of rounded form, controlled as to size, metal compatibility, and volume in the sealant. As parts 1 and 2 come together, the metal beads 12 roll on, and jostle among, one another, adapting to the changing shape of the sealant 11. The sealant may be any conventional sealant, with the addition of the metal beads. Typical formulae are as follows:

| Polyelastomer type: | % by weight |
|---|---|
| Polychloroprene | 26.5 |
| Hindered phenol | .5 |
| Magnesium oxide | 1.0 |
| Butyl phenolic resin | 5.0 |
| Terpene phenolic resin | 4.0 |
| Soft clay | 26.0 |
| Zinc oxide | 1.5 |
| Hexane | 17.5 |
| Methyl ethyl ketone | 10.5 |
| Toluene | 7.5 |
| | 100. |

| Epoxy type: | % by volume |
|---|---|
| Epoxy resin | 93.0 |
| Catalysed dicyandiamide | 7.0 |
| | 100. |

The gap between members, and the finished sealant width, are readily controlled. As an example, for a gap of 1 mm (0.039") and a width of 20 mm (0.787"), beads of 1 mm diameter (0.039" diameter) are used, and the extrusion or tubular form of sealant should be 5 mm (0.197") diameter.

The proportion of metal beads to be added depends on:

(a) The contraction or expansion of the sealant being used, on cure.

(b) Whether the beads are included solely for spacing purposes, or whether they are to provide bridge metal for welding. Since there is wide variation in (a), a basic proportion is shown here on the basis of neutral expansion or contraction of the sealant, and thereafter an adjustment may be made to suit the actual sealant used. Where the beads are to be used solely for spacing purposes, a proportion of about 10% by volume of beads to about 90% of sealant is adequate, but the beads must be well blended in and the sealant have enough thixatropicity to maintain the beads in uniform dispersion. For such applications, an adjustment of proportion is seldom required to suit expansion or contraction of sealant.

For weld bridging, the proportion should maintain the beads in virtual contact in the blend. For an ideal sealant (no expansion or contraction on curing) the proportion, by volume, is achieved by starting with a full measure of beads of the selected gap size. Since the beads are generally spherical, the volume available for the sealant is the space existing between the beads at points where their surfaces do not meet. This "vacant" space is approximately 41.6% of the full measure, and varies only slightly for different sizes of beads. As an example, 1 liter of the beads, blended with 0.416 liters of the sealant, produces virtually 1 liter of mixed product. It is understood that this proportion is valid only if the bead size selected for gap-spacing purposes does not have a significant proportion of smaller size beads in the batch, as these smaller beads occupy spaces anticipated for the sealant. It is this latter factor which allows careful combining of bead sizes in order to provide the greatest amount of bridge metal available at any spot throughout the seal. For the sake of clarity, the drawings emphasize the large spacing beads, but it will be understood that the spaces indicated as mainly sealant may contain a quantity of smaller beads concealed within the sealant. For example, to 1 liter measure of gap-size beads, 0.3 liters of smaller beads may be added, reducing the sealant volume to about 0.24 liters (the spaces between the smaller beads must also be filled with sealant). The sealant proportion in the blends should seldom be below 10% of gross volume, as desirable sealant behaviour may be affected.

The beads used in the blend are normally (but not necessarily exclusively) metal, and may be produced by any method, such as spattering, shot, or ball-bearing techniques. However, plastic beads can also be used for certain applications. Although suitable metal beads are readily available in steel, stainless steel, and aluminum, among others, practically any desirable metal may be specified. Thus, the bridge metal may match or complement the parent metal of the parts being joined. Where the parent metal must be from less-noble metals for reasons of cost, the bridge metal provided by the beads may be selected to produce high-nobility welds, or high strength, or other requirement. For example, in the case of two steel parts, regardless of their steel quality, the beads may be selected of "18-8-mo" stock to produce a weld better than the parent metal. As an extension of this, and using the same example, the large or spacing beads may be mild steel, and constitute 74% of the beads used. Smaller, space-filling beads of nickel may constitute 18% of the beads used. Other small space-filling beads of chromium may constitute 8% of the beads used. Finally, other small beads in molybdenum may complete the blend using conventional trace quantities, but should be relatively fine and well dispersed throughout the sealant. The welding procedure unites these components as bridge metal, and bonds time into the parent metal, within the protection of a suitable sealant. Similarly, light weight alloys may be used or produced for aircraft or other applications.

Beads may be surface treated, before blending, to produce high-strength bonds with the sealant by such means as conventional metal cleaning techniques. Further, beads may be surface treated against corrosion, such as by a conventional potassium bichromate deposite on mild steel beads. Further, they may be treated with surface deposits of suitable welding fluxes to aid in achieving the best weld quality. Corrosion inhibitors, weld-fluxing agents, and wetting agents may also be added to the sealant.

In FIG. 4, the joining shown started in FIG. 3 is now shown completed. Parts 1 and 2 have been brought together by the weld clamping assembly 3 and 4 to the predetermined gap controlled by the spacing beads 12, automatically limiting spread of sealant and exerting reasonable control over sealant exposure at 11. The bridge metal 7 incorporates adjacent beads as required, leaving the parent metal virtually intact. The beads 12 conduct heat radially away from the weld, initiating or accelerating cure of the sealant. Little or no distortion of the weld is now possible due to the limited compressibility of the sealant components, which oppose bending moments in the weld axis under service conditions. It is understood that a sealant of good adhesive properties will add considerable strength to the joint beyond that contributed by the weld. It is also understood that such adhesive sealants may be cured by heat or other means at this point or at a later production stage (such as an automobile paint drying line) without requiring welding, the strength being provided by sealant bond alone. The latter construction permits slight lateral movement of the two parts 1 and 2 relative to each other, the beads rolling internally in the joint within the elastic limits of the sealant, providing vibration and sound absorption in the structure when desired. If the beads were other than rounded (for example, crystalline, flaked, or sharp) such a construction could lead to early joint failure due to shearing action of the particles.

Figure 5:
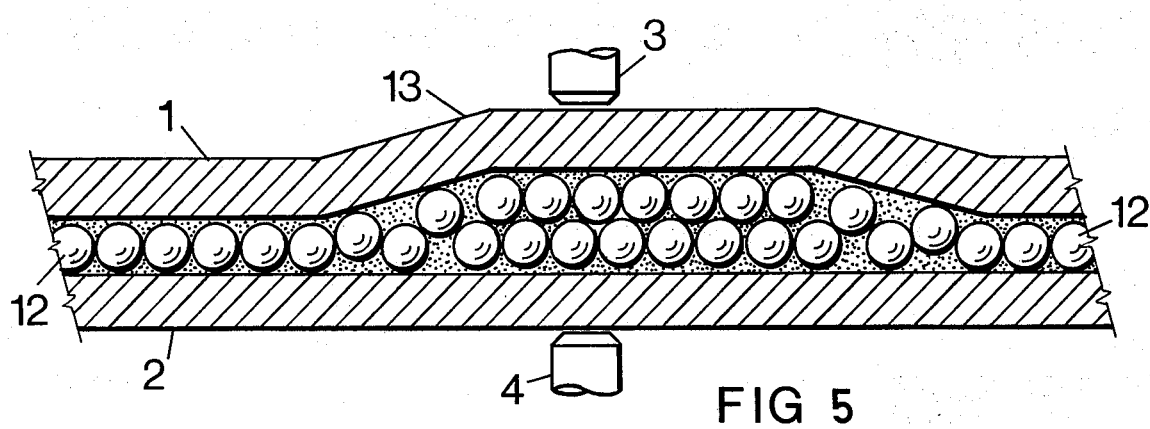
FIG. 5 is a longitudinal section of a joining of two metal parts by sealing and spot welding in accordance with this invention, showing how the method accommodates deformation or imperfections in the mating surfaces of the parts.

In FIG. 5, parts 1 and 2 are shown at a point longitudinal in the joint where a distortion 13 exists in one of the parts. This may have been the result of forming tolerances for parts 1 and 2, die discrepancies, or handling damage. The weld clamping assembly 3 and 4 has brought the gap to the one-bead predetermined minimum 12 throughout most of the joint, but at the point of distortion it may be impractical or impossible to provide sufficient pressure to improve the alignment. In addition, were such pressure to be applied, the release of the pressure after welding could pre-stress the weld to an unsafe degree or even fracture it. Since such damage remains concealed by the parts, it is a dangerous practice. Thus, the beads shown bulking in the deformation area 13 provide a reasonably constant relation for weld current compared to that existing at the minimum gap, and also provides bridge metal to create an adequate weld. This relieves tolerance restrictions to some degree for the parts being bonded, simplifies welding current adjustment, reduces rejection rate of otherwise unuseable parts, and generally leads to economies of manufacture.

Figure 6:
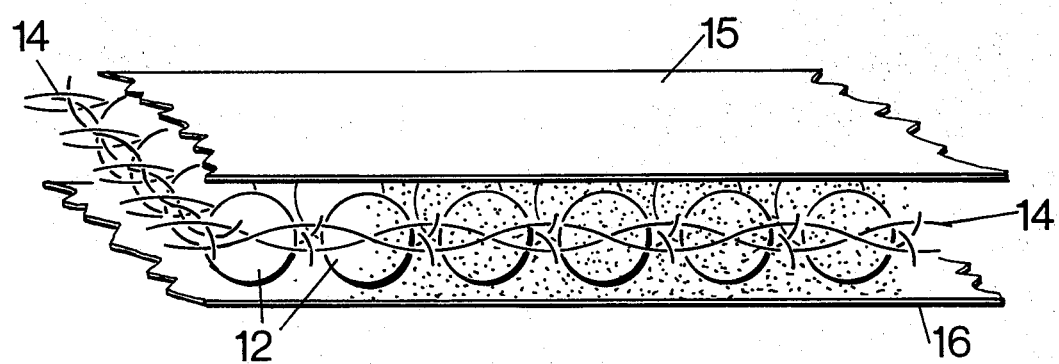
FIG. 6 is a cut-away, three-dimensional view of a sealant in accordance with this invention, showing a meshed retainer positioning the metal beads in tape form.

In FIG. 6, a tape form of the bead-bearing sealant is shown, in which the main (or spacing) beads 12 are shown relatively maintained in position by an open weave tape 14, which may also be of a perforated strip nature. A strip of open meshed textile material may also be used retainer acts somewhat similarly to the spacer within a ball-bearing assembly. The size of the mesh is determined by the bead sizes involved. The retainer also acts to improve the handling characteristics of the tape, since, prior to cure, the bead-bearing sealant has little strength of its own. One or both of the protecting surfaces 15 and 16, which may be paper, plastic, or other material, may be used to protect the active components during handling, but such would normally be removed prior to application of the seal within a joint. It is an object of this invention that such protective surface may a material compatible with the sealant components, such as polychloroprene film for sealants of polychloroprene type, or such as epoxy resin film for sealants of epoxy type. Tapes made in this way may be incorporated "dry" into the joint for handling ease, the protective film being absorbed into, or participating in, the sealant function during cure.

Figure 7:
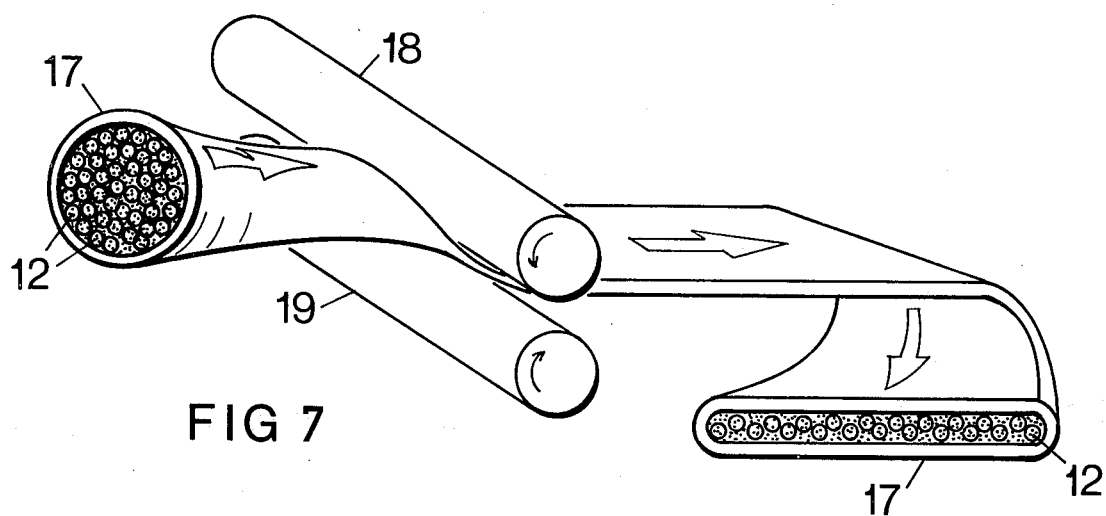
FIG. 7 is a perspective view showing a tube form of the invention, and also showing one method of shaping the tube and contents into alternative forms.

In FIG. 7, the conventional concept of an internal carrier strip for a sealant is reversed by providing a carrier shell 17 in tubular form, such tube containing other necessary components of the sealant including the beads 12, as required. The shell 17 is formed from material compatible to, or a specific component of, the sealant formulation, blending into, or participating in, the sealant function during cure, as previously described. Two rollers 18 and 19 indicate one method of reshaping the original section into a different section, in this case a tape form. Depending on the material used for the shell, heat or other means may be used to soften the shell so as to set it into the desired shape. The simplest method is to preheat the shell just before the rollers 18 and 19, or to heat the rollers. Such heat should be below that required to initiate complete cure of the sealant. For example, in the epoxy type sealant previously described, the shell may be formed from the epoxy resin, which, in this case melts at 115° C. (239° F.), thereupon dissolving the dicyandiamide and irreversibly starting the cure process. Hence, the preheat in such case should be below 115° C. (239° F.), and preferably only high enough to soften the shell. Because of the confining nature of the shell, the balance of the ingredients may be in dry form, dry-mixed prior to shell filling. This is particularly adaptable to dry epoxy formulations as in the previous example. Thus, a completely dry tube, strip, or other form is produced. As well as being easier to handle, it also reduces allergy vulnerability for persons handling the sealants. In addition, a relatively permanent shelf life becomes practical for the sealant forms so produced, leading to manufacturing and stocking economies. In application, such forms are placed between the parts to be joined, and then the welds are made, which themselves can initiate or complete the cure, or cure can be completed by subsequent application of heat. Similarly, if means other than welding are available to hold the parts in position, cure can be completed without the necessity of welding, by later application of heat. For example, in automobile manufacture, a typical paint drying line exposes the vehicle to 170° C. (338° F.) for 24 minutes. The epoxy sealant example given previously cures completely in 15 minutes at 170° C. (338° F.).

Figure 8:
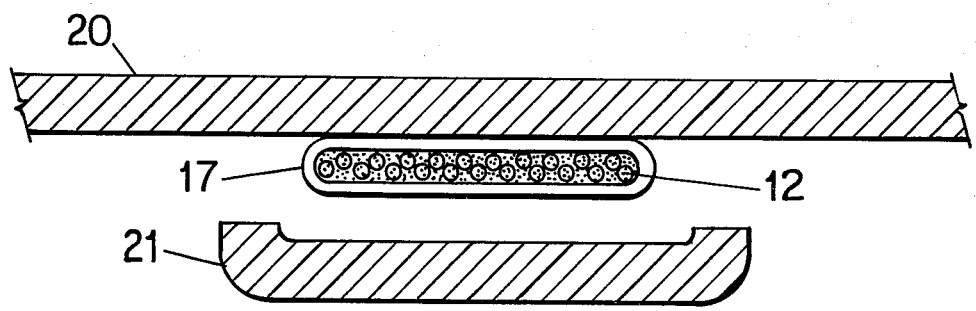
FIG. 8 is a cross section of a joining of two metal parts in accordance with this invention, showing magnetic positioning and retention of the sealant in a pendant position (view drawing as a horizontal section), or on the side of a vertical member (view drawing as a vertical section).

In FIG. 8, a sealant shell 17 contains sealant components as previously described, but in this case contains steel bands which have been magnetized. The magnetizing can be done either prior to blending the components, or after assembly into the desired sealant section, hence the method applies to any form of the sealant when the metal bead components are of a composition which can be magnetized. This permits the handling and retention of the sealant, in wet or dry forms, applying it to overhead surfaces or to upright surfaces as desired. Thus, the steel member 20 may be considered to be in either horizontal section or in vertical section, with the sealant form 17 adhering to it solely by magnetic attraction. The other part 21, to be joined to part 20, is shown being brought into position, after which the two parts 20 and 21 will be separated solely by the sealant form 17, and virtually held together by magnetic attraction. Bonding can follow by welding and heat cure, or simply by curing the seal. This illustration is characteristic of an automobile roof panel 20, with a reinforcing rib 21 being positioned for stiffening purposes. In the design shown for part 21, the bead size is selected to prevent the upturned lips of part 21 from making bare contact with the surface of the roof panel 20, as otherwise this could lead to undesirable noise generation when the vehicle is in service. This arrangement, coupled with an adhesive sealant of good bonding characteristics such as previously described, can obviate the need of welds along the member 21, cure being effected readily in a paint drying line, for example.

Figure 9:
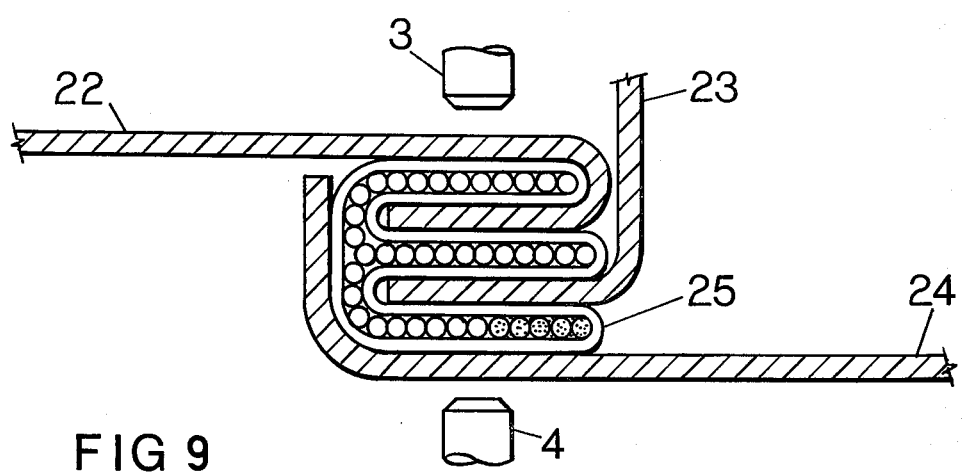
FIG. 9 is a cross section of a joining of two or more parts, showing how specially-shaped forms of the invention can position or retain the parts prior to bending.

In FIG. 9, three members 22, 23, and 24 are to be bonded together and simultaneously sealed. A sealant section variation 25, developed as previously described, is positioning all three parts. It may additionally hold parts 22 and 23 together by mechanical strength at this stage, or alternatively hold all three parts together by magnetic attraction. This allows the manufacturer of the assembly a choice for the next step. The welding clamp assembly 3 and 4 may apply pressure, and weld through the entire combination, assisted by the presence of the metal bead components, and cure completed, if required, in later stages. Alternatively, the bonding, sealing, and cure may be effected by heat application only, again as in the characteristic paint drying line example.

I claim as my invention:

1. A method of welding two metal members together in which a sealant is used between mating surfaces, said sealant containing discrete non-spherical metal beads of a rounded shape and controlled as to bead size; and bringing the members together by spot welding through the beads, with the beads providing spacing and gap filling functions as well as bridge metal in order to lessen depletion of the members being welded.

2. A method according to claim 1 wherein the individual beads are composed of an alloy compatible with the metal members being bonded.

3. A method according to claim 1 wherein beads of various sizes and differing metal composition are employed to create alloys within the welds bonding two or more metal members together.

4. A method according to claim 1 wherein the sealant is an elastic adhesive compound.

5. A method according to claim 1 wherein the sealant is in a dry form, with the bonding and/or sealing functions thereof being developed by a curing process.

6. A method according to claim 1 wherein a strip of open meshed textile or perforated material is used as a carrier strip to support the sealant prior to and during application, the mesh of said material being selected to permit penetration by the beads.

7. A method according to claim 1 wherein the carrier strip has protective outer faces which are composed of a material which is absorbed into the sealant upon curing.

8. A method according to claim 1 wherein the sealant is contained within a carrier shell formed of a material selected from the group consisting of a material compatible with the sealant and a specific component of the sealant.

9. A method according to claim 8 wherein the sealant shell is formed in a contour to conform to the members being bonded.

10. A method according to claim 9 wherein the contour of the sealant shell is designed to hold the members together or in alignment.

11. A method according to claim 1 wherein the beads are magnetized.

12. A method according to claim 1 wherein the proportion of beads in the sealant is selected to control internal stresses due to contraction or expansion of the sealant during curing.

13. A method according to claim 1 wherein the beads are pretreated with corrosion inhibitors, welding fluxes, or metal cleaning agents.

14. A method according to claim 1 wherein the sealant contains corrosion inhibitors, weld-fluxing agents, or wetting agents.

* * * * *